United States Patent
Kominato et al.

(10) Patent No.: US 11,749,986 B2
(45) Date of Patent: Sep. 5, 2023

(54) IN-VEHICLE POWER SUPPLY SYSTEM

(71) Applicant: Yazaki Corporation, Tokyo (JP)

(72) Inventors: Yasuhiro Kominato, Makinohara (JP); Sadaharu Okuda, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/852,959

(22) Filed: Jun. 29, 2022

(65) Prior Publication Data
US 2023/0010374 A1  Jan. 12, 2023

(30) Foreign Application Priority Data
Jul. 7, 2021  (JP) .................................. 2021-112929

(51) Int. Cl.
*H02J 1/08* (2006.01)
*B60L 53/22* (2019.01)
*H02J 7/14* (2006.01)
*H02J 9/06* (2006.01)

(52) U.S. Cl.
CPC .............. *H02J 1/082* (2020.01); *B60L 53/22* (2019.02); *H02J 7/1438* (2013.01); *H02J 9/061* (2013.01); *B60L 2210/14* (2013.01); *H02J 2310/40* (2020.01)

(58) Field of Classification Search
None
See application file for complete search history.

(56) References Cited

U.S. PATENT DOCUMENTS

| | | | |
|---|---|---|---|
| 6,340,848 B1 | 1/2002 | Maeda | |
| 2018/0241095 A1* | 8/2018 | Nozaki | ..................... H02J 7/00 |
| 2019/0334375 A1 | 10/2019 | Wataru et al. | |
| 2019/0366957 A1 | 12/2019 | Satake | |
| 2020/0247227 A1* | 8/2020 | Kawamura | ......... H01M 50/249 |
| 2022/0231537 A1* | 7/2022 | Hirota | ...................... H02J 7/16 |

FOREIGN PATENT DOCUMENTS

| | | |
|---|---|---|
| EP | 3 575 119 A1 | 12/2019 |
| JP | 2000-318545 A | 11/2000 |
| JP | 2019-193517 A | 10/2019 |
| JP | 2019-209717 A | 12/2019 |
| WO | WO-2019102717 A1 * 5/2019 | ............... B60K 1/04 |

* cited by examiner

*Primary Examiner* — Jared Fureman
*Assistant Examiner* — Aqeel H Bukhari
(74) *Attorney, Agent, or Firm* — Sughrue Mion, PLLC

(57) ABSTRACT

An in-vehicle power supply system supplies electric power to a large electric power load and a small electric power load. The in-vehicle power supply system includes a first power supply unit to output electric power having a first voltage higher than a total power supply voltage required by the large and small electric power loads, zone management units to manage predetermined zones on the vehicle, a power supply trunk line unit connecting the first power supply unit and the zone management units and a step-down conversion unit disposed in a zone of one zone management unit of the zone management units and to convert the electric power having the first voltage into electric power having a second voltage lower than the first voltage. The power supply trunk line unit includes a high-voltage power supply line to distribute the electric power having the first voltage.

4 Claims, 3 Drawing Sheets ical components, large electric power loads that consume a very large amount of current and small electric power loads that consume a small amount of current are mixed. Examples of the large electric power load on the vehicle include an electric stabilizer device and an electric power steering device.
IN-VEHICLE POWER SUPPLY SYSTEM

CROSS-REFERENCE TO RELATED APPLICATION

The present application claims priority to Japanese Patent Application No. 2021-112929 filed on Jul. 7, 2021, the entire content of which is incorporated herein by reference.

TECHNICAL FIELD

The presently disclosed subject matter relates to an in-vehicle power supply system.

BACKGROUND

In related art, in an auxiliary system of a general vehicle, a power supply including an alternator (generator) and an in-vehicle battery capable of supplying electric power having a voltage of 12 volts supplies electric power, which is required for various electrical components, to the various electrical components via a wire harness routed in each part of the vehicle.

In addition, for example, a power supply redundancy system in the related art includes a plurality of power supplies that handle two types of voltages of 12 volts and 48 volts. Further, since the power supply voltage can be converted using a DC/DC converter provided in the power supply, electric power can be supplied to a load even when a ground fault or a short circuit occurs in one of power supply systems (for example, see JP2019-193517A).

An auxiliary system on a vehicle is provided with a large number of various types of electrical components. Among these electrical components, large electric power loads that consume a very large amount of current and small electric power loads that consume a small amount of current are mixed. Examples of the large electric power load on the vehicle include an electric stabilizer device and an electric power steering device.

A power supply voltage required by the small electric power load is generally 12 volts, but a power supply voltage required by the large electric power load is often higher than 12 volts. Therefore, in a general vehicle having only a power supply of 12 volts, a required power supply voltage of 48 volts or the like is obtained by boosting the power supply voltage of 12 volts by a DC/DC converter mounted on each device having the large electric power load. In addition, in order to avoid an increase in electric power loss caused by an influence of a large current flowing through each large electric power load, an electric wire having a large cross-sectional area is used for the power supply line of the wire harness. Therefore, a power supply required by the large electric power load is a factor of increasing a cost of the entire vehicle.

On the other hand, in a case of a vehicle having two types of power supply systems as in the related art, a voltage corresponding to a power supply voltage required by each electrical component can be supplied from a predetermined power supply system in a steady state. That is, electric power can be supplied from an in-vehicle battery of 12 volts to electrical components requiring the power supply voltage of 12 volts, and electric power can be supplied from an in-vehicle battery of 48 volts to electrical components requiring the power supply voltage of 48 volts.

However, in the system as disclosed in the related art, since it is necessary to mount a power supply unit such as an in-vehicle battery for each of the voltages of 12 volts and 48 volts for the auxiliary system, the cost of the entire vehicle is significantly increased.

In addition, there is a large electric power load that consumes a very large amount of electric power among the electrical components requiring the power supply voltage of 12 volts. In order to prevent a large electric power loss from occurring when the electric power is supplied to such a large electric power load, it is necessary to form the power supply line of the wire harness by a thick electric wire. In addition, since there is a possibility that a large voltage fluctuation occurs in the power supply voltage due to the influence of the large current flowing through the large electric power load, it is necessary to provide a load side circuit of a 12V system with a margin for a power supply voltage fluctuation, which leads to the increase in electric power loss.

SUMMARY

The presently disclosed subject matter provides an in-vehicle power supply system capable of preventing the increase in the cost of the entire vehicle, reducing a diameter of the power supply line in the wire harness, and reducing the electric power loss.

According to an illustrative aspect of the presently disclosed subject matter, an in-vehicle power supply system is configured to supply electric power to a large electric power load configured to consume a first electric power and to a small electric power load configured to consume a second electric power smaller than the first electric power. The in-vehicle power supply system includes a first power supply unit configured to output electric power having a first voltage higher than a total power supply voltage required by the large electric power load and the small electric power load, a plurality of zone management units configured to respectively manage predetermined zones on the vehicle, a power supply trunk line unit connecting the first power supply unit and the plurality of zone management units and a step-down conversion unit disposed in a zone of one zone management unit of the plurality of zone management units and configured to convert the electric power having the first voltage into electric power having a second voltage lower than the first voltage. The power supply trunk line unit includes a high-voltage power supply line configured to distribute the electric power having the first voltage.

Other aspects and advantages of the presently disclosed subject matter will be apparent from the following description, the drawings and the claims.

DESCRIPTION OF EMBODIMENTS

A specific embodiment according to the presently disclosed subject matter will be described below with reference to the drawings.

Figure 1:
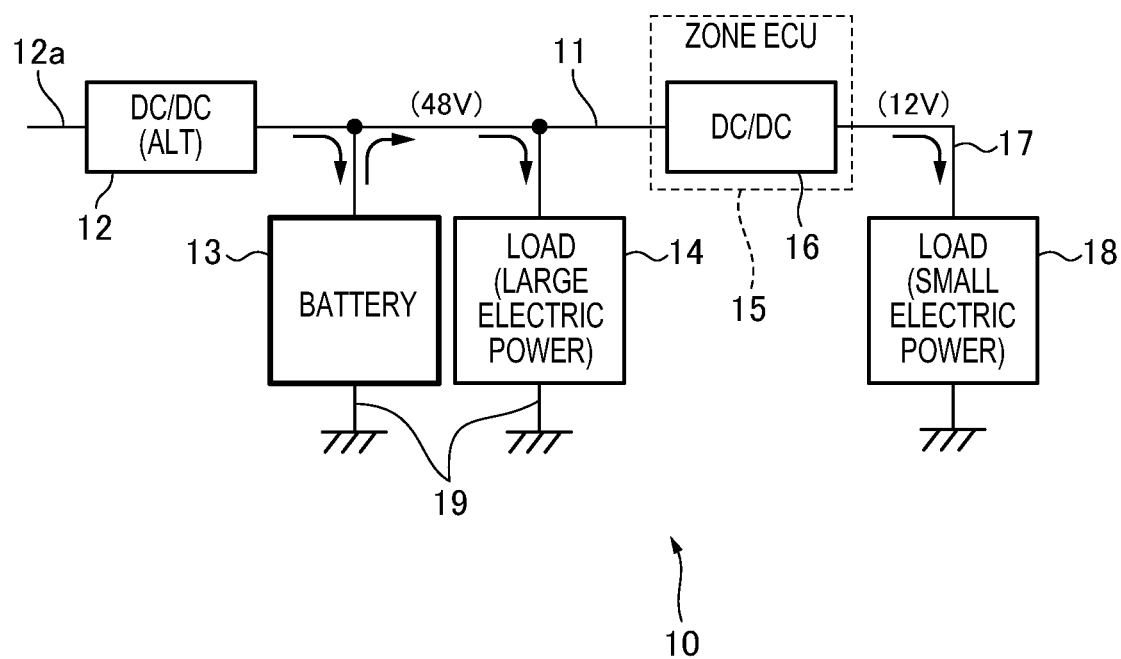
FIG. 1 is a block diagram showing a basic configuration of an in-vehicle power supply system according to an embodiment of the presently disclosed subject matter.

FIG. 1 is a block diagram showing a basic configuration of an in-vehicle power supply system 10 according to the embodiment of the presently disclosed subject matter.

The in-vehicle power supply system 10 is mounted on, for example, a hybrid car, an electric vehicle, or a general vehicle using only an engine as a drive source, and can be used for supplying electric power to various electrical components of an auxiliary system on the vehicle.

The in-vehicle power supply system 10 of FIG. 1 includes a power supply trunk line 11, a direct-current/direct-current (DC/DC) converter 12, an auxiliary system battery 13, a large electric power load 14, a zone electronic control unit (ECU) 15, a DC/DC converter 16, a power supply branch line 17, a small electric power load 18, and a ground 19. The above-described constituting components of the in-vehicle power supply system 10 are normally mounted on a vehicle in an integrated state as one wire harness.

An input side of the DC/DC converter 12 is connected to a drive system high-voltage power supply line 12a. The drive system high-voltage power supply line 12a can output electric power having about several hundred volts of DC high-voltage so as to supply high power to an electric motor that drives the vehicle. In a case of a general vehicle without the drive system high-voltage power supply line 12a, an alternator (ALT), instead of the DC/DC converter 12, is connected to the in-vehicle power supply system 10.

The DC/DC converter 12 steps down the voltage (several hundred volts) of the drive system high-voltage power supply line 12a by performing switching inside the DC/DC converter 12 to generate 48 volts of DC electric power. Then, the 48 volts of DC electric power output from the DC/DC converter 12 or the alternator is supplied to the power supply trunk line 11.

The auxiliary system battery 13 is a secondary battery capable of supplying the electric power to various electrical components of the auxiliary system that does not belong to a vehicle drive system, and in the example shown in FIG. 1, can charge and discharge DC electric power having the voltage of 48 volts. That is, the auxiliary system battery 13 can charge and accumulate the 48 volts of DC electric power output by the DC/DC converter 12, and can discharge and supply the accumulated 48 volts of DC electric power to the power supply trunk line 11. Actually, the electric power accumulated in the auxiliary system battery 13 is used in order to supply the electric power to various electric components of the auxiliary system when a part of large electric power consumed by the large electric power load 14 is temporarily taken out even when the vehicle is traveling, or when the vehicle is parking, or the like.

The large electric power load 14 is an electrical component that consumes very large electric power among various electrical components belonging to the auxiliary system. For example, an electric stabilizer device and an electric power steering device mounted on the vehicle consume very large electric power when the electric stabilizer device and the electric power steering device operate, and thus are regarded as the large electric power load 14.

In the case of a general vehicle, electric power having a voltage of 12 volts is often supplied via a standard power supply line even in a large electric power load, and a large current flows through the large electric power load. Therefore, it is necessary to make the power supply line for supplying electric power to the large electric power load very thick.

On the other hand, in the in-vehicle power supply system 10 shown in FIG. 1, since the electric power having the voltage of 48 volts is supplied from the power supply trunk line 11 to the large electric power load 14, it is possible to significantly reduce a current flowing through the large electric power load 14. Therefore, a diameter of the power supply line of the power supply trunk line 11 can be reduced. In addition, the large electric power load 14 does not need to include a booster circuit therein.

On the other hand, the small electric power load 18 corresponds to an electrical component with relatively low electric power consumption among the various electrical components belonging to the auxiliary system. For example, electrical components such as various ECUs, various lighting devices, an audio device, and a navigation device are regarded as the small electric power load 18.

In the configuration of FIG. 1, the small electric power load 18 is connected to the power supply branch line 17 having a voltage of 12 volts to be used. The power supply branch line 17 is connected to a downstream side of the zone ECU 15.

The zone ECU 15 is a device for managing power supply to a load in a specific zone on the vehicle, and incorporates a DC/DC converter 16. The zone managed by the zone ECU 15 may represent a specific region in a space on the vehicle or may represent a specific group in functional grouping. Therefore, a plurality of zone ECUs 15 independent of each other are usually installed on the vehicle.

As shown in FIG. 1, since the zone ECU 15 is connected to the power supply trunk line 11, the zone ECU 15 can supply the electric power having the voltage of 48 volts to the DC/DC converter 16 in the zone ECU 15 as an input. The DC/DC converter 16 has a function of generating DC electric power having the voltage of 12 volts based on the DC electric power having the voltage of 48 volts applied to the DC/DC converter 16 as the input thereof. Therefore, the zone ECU 15 can supply the DC electric power having the voltage of 12 volts to the power supply branch line 17 connected to the downstream side of the zone ECU 15.

The zone ECU 15 can also directly supply, to the downstream side, electric power distributed from the DC electric power having the voltage of 48 volts supplied from the power supply trunk line 11 as the input. Although not shown in FIG. 1, the zone ECU 15 incorporates a control computer and a communication interface as in a general ECU.

Figure 2:
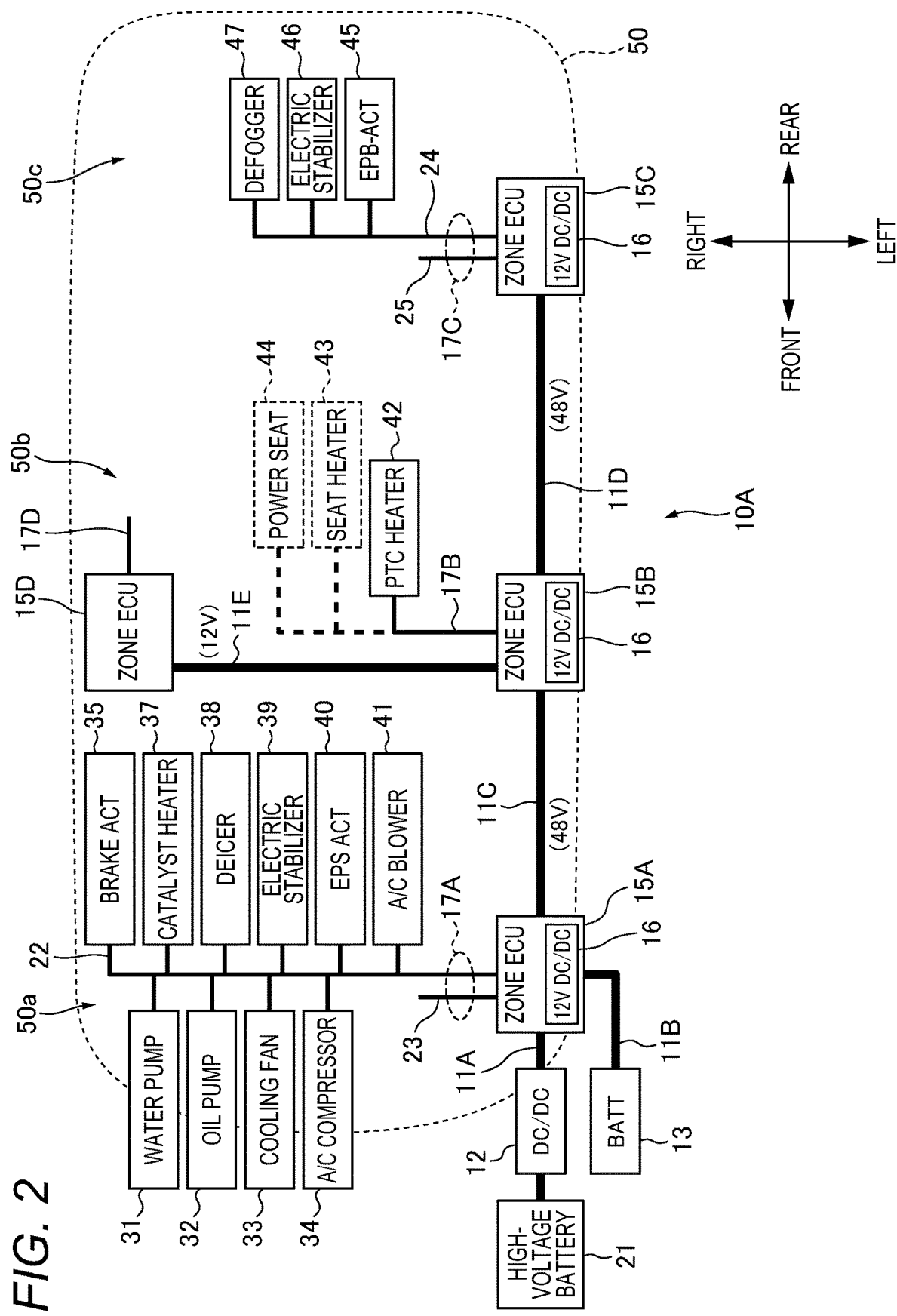
FIG. 2 is a block diagram showing a specific configuration example of the in-vehicle power supply system according to the embodiment of the presently disclosed subject matter.

FIG. 2 is a block diagram showing a specific configuration example of an in-vehicle power supply system 10A according to the embodiment of the presently disclosed subject matter. FIG. 2 shows an outline of an arrangement example of main constituting components in a state in which a vehicle is viewed from above.

A vehicle body 50 of the vehicle shown in FIG. 2 includes an engine room 50a, a vehicle cabin instrument panel region 50b, and a trunk room 50c. In the engine room 50a, various electrical components in the auxiliary system such as a water pump 31, an oil pump 32, a cooling fan 33, an air conditioner (A/C) compressor 34, a brake actuator (ACT) 35, a catalyst heater 37, a deicer 38, an electric stabilizer 39, an electric power steering (EPS) actuator 40, and an air conditioner blower 41 are provided.

In addition, as an example, various electrical components in the auxiliary system such as a positive temperature coefficient (PTC) heater 42, a seat heater 43, and a power seat 44 are provided in a vehicle cabin. In addition, as an example, various electrical components in the auxiliary system such as an electric power assist brake (EPB) actuator 45, an electric stabilizer 46, and a defogger 47 are provided inside the trunk room 50c.

The in-vehicle power supply system 10A includes, in the engine room 50a, a zone ECU 15A for managing a zone assigned to the engine room 50a. In addition, the in-vehicle power supply system 10A includes zone ECUs 15B, 15D for managing a left side zone and a right side zone of the vehicle cabin instrument panel region 50b at left and right portions of the vehicle cabin instrument panel region 50b, respectively. The in-vehicle power supply system 10A includes, in the trunk room 50c, a zone ECU 15C for managing a zone assigned to the trunk room 50c.

The zone ECUs 15A and 15B are connected to each other by a power supply trunk line 11C, the zone ECUs 15B and 15C are connected to each other by a power supply trunk line 11D, and the zone ECUs 15B and 15D are connected to each other by a power supply trunk line 11E.

The DC/DC converter 12 and the auxiliary system battery 13 are connected to the zone ECU 15A via power supply trunk lines 11A and 11B, respectively. An input side of the DC/DC converter 12 is connected to an output side of a high-voltage battery 21. The high-voltage battery 21 is formed of a secondary battery such as a lithium ion battery, can store electric power having, for example, about several hundred volts of high voltage, and can supply the stored electric power to an electric motor for the vehicle traveling or the like.

The DC/DC converter 12 converts electric power having about several hundred volts of DC high-voltage output from the high-voltage battery 21 into the DC electric power having the voltage of 48 volts, and supplies the DC electric power to the power supply trunk line 11A. The auxiliary system battery 13 is charged by the DC electric power having the voltage of 48 volts supplied from the DC/DC converter 12, and can output, to the power supply trunk line 11B, the DC electric power having the voltage of 48 volts accumulated by the charging.

The power supply trunk lines 11A, 11B, 11C are electrically connected to one another inside the zone ECU 15A. The power supply trunk lines 11C and 11D are electrically connected to each other inside the zone ECU 15B. Therefore, the DC electric power having the voltage of 48 volts output from the DC/DC converter 12 or the auxiliary system battery 13 is supplied to the power supply trunk lines 11C, 11D. Each of the power supply trunk lines 11C, 11D includes a power supply line for distributing the DC electric power at least having the voltage of 48 volts.

The zone ECUs 15A, 15B, 15C respectively incorporate the DC/DC converters 16. Since there is no load that consumes large electric power in the zone managed by the zone ECU 15D, the zone ECU 15D does not include the DC/DC converter 16. The power supply trunk line 11E connecting the zone ECUs 15B, 15D includes a power supply line for distributing the DC electric power having the voltage of 12 volts.

As shown in FIG. 2, a power supply branch line 17A connected to a downstream side of the zone ECU 15A includes a 48V power supply line 22 and a 12V power supply line 23. The 48V power supply line 22 is a power supply line for outputting the electric power (48 volts) obtained by distributing or branching the DC electric power having the voltage of 48 volts supplied from the power supply trunk line 11A or 11B, and the 12V power supply line 23 is a power supply line for outputting the electric power (12 volts) output from the DC/DC converter 16 in the zone ECU 15A. The DC/DC converter 16 generates the electric power of 12 volts by performing step-down conversion on the electric power of 48 volts.

In the example shown in FIG. 2, the water pump 31, the oil pump 32, the cooling fan 33, the air conditioner compressor 34, the brake actuator 35, the catalyst heater 37, the deicer 38, the electric stabilizer 39, the EPS actuator 40, and the air conditioner blower 41 are connected to the 48V power supply line 22.

In particular, since the electric stabilizer 39 and the EPS actuator 40 consume very large electric power, when the electric stabilizer 39 and the EPS actuator 40 are connected to the 48V power supply line 22 to which the voltage of 48 volts is supplied, it is effective to reduce diameters of electric wires such as the 48V power supply line 22 and the trunk line. Various small electric power loads requiring the power supply voltage of 12 volts are connected to the 12V power supply line 23.

On the other hand, the PTC heater 42, the seat heater 43, and the power seat 44 installed in the vehicle cabin are connected to a downstream side of the zone ECU 15B via the power supply branch line 17B. The power supply branch line 17B includes a power supply line that distributes electric power of 48 volts obtained by distributing or branching the electric power of 48 volts supplied to the power supply trunk line 11C in the zone ECU 15B.

To the power supply line of 12 volts included in the power supply trunk line 11E, the electric power of 12 volts generated by the DC/DC converter 16 in the zone ECU 15B performing the step-down conversion on the electric power of 48 volts is supplied. The power supply branch line 17D connected to a downstream side of the zone ECU 15D is supplied with the electric power of 12 volts obtained by distributing or branching the electric power of the power supply line of 12 volts of the power supply trunk line 11E.

Meanwhile, the power supply branch line 17C of the zone ECU 15C installed in the trunk room 50c includes a 48V power supply line 24 and a 12V power supply line 25. The 48V power supply line 24 can output the electric power of 48 volts obtained by distributing or branching the electric power of 48 volts supplied from the power supply trunk line 11D in the zone ECU 15C. The 12V power supply line 25 can output the electric power of 12 volts obtained by the DC/DC converter 16 in the zone ECU 15C performing the step-down conversion on the electric power of 48 volts supplied from the power supply trunk line 11D.

The EPB actuator 45, the electric stabilizer 46, and the defogger 47 installed in the trunk room 50c are connected to the 48V power supply line 24. In particular, since the electric stabilizer 46 consumes very large electric power, when the electric stabilizer 46 is connected to the 48V power supply line 24 to which the voltage of 48 volts is supplied, it is effective to reduce diameters of electric wires such as the 48V power supply line 24 and the trunk line. Various small electric power loads requiring the power supply voltage of 12 volts can be connected to the 12V power supply line 25.

In the in-vehicle power supply system 10A of FIG. 2, since the right side zone of a vehicle cabin instrument panel managed by the zone ECU 15D has less large electric power load, the zone ECU 15D that includes the power supply line of 12 volts in the power supply trunk line 11E and does not include the DC/DC converter 16 is installed. It is desirable that the power supply trunk line 11E also includes the power supply line of 48 volts, so that the large electric power load can also be connected to the downstream side of the zone ECU 15D.

Figure 3A:
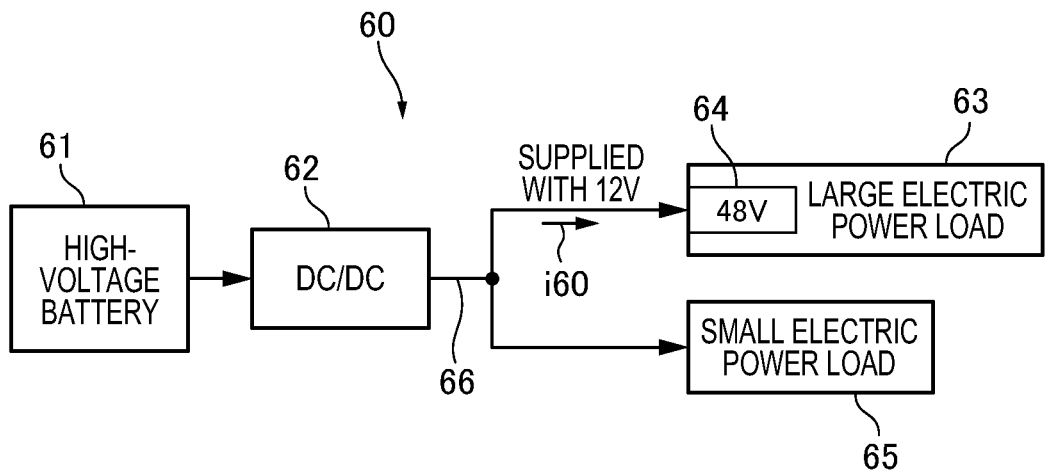
FIG. 3A and FIG. 3B are block diagrams each showing a configuration example of the in-vehicle power supply system.
Figure 3B:
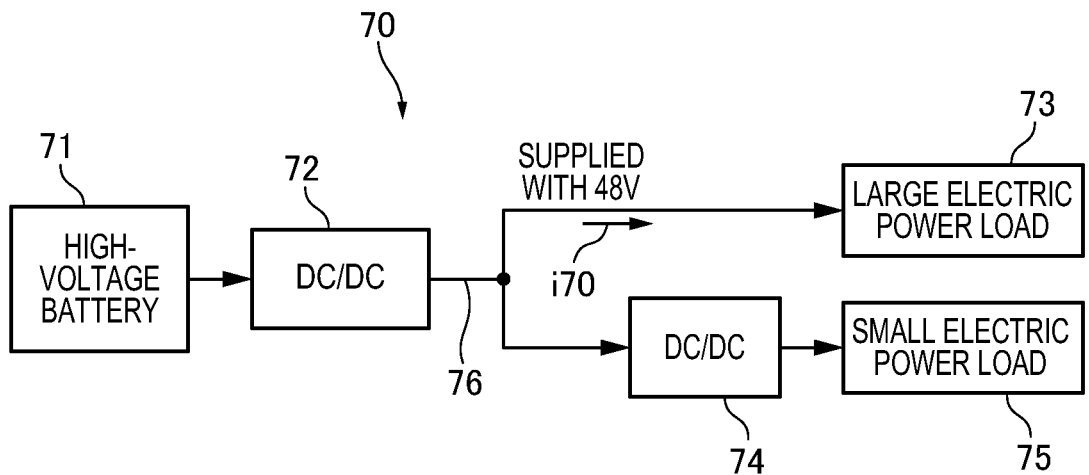

FIG. 3A and FIG. 3B are block diagrams each showing a configuration example of the in-vehicle power supply system. An in-vehicle power supply system 60 shown in FIG. 3A is configured such that the electric power of 12 volts is supplied to a power supply trunk line 66 as in the case of a general vehicle. In the in-vehicle power supply system 60, a large electric power load 63 incorporates a DC/DC converter 64, and the DC/DC converter 64 boosts the electric power of 12 volts to the electric power of 48 volts therein and then supplies the electric power to a load side.

An in-vehicle power supply system 70 shown in FIG. 3B is configured to supply the electric power of 48 volts to a power supply trunk line 76, similarly to the in-vehicle power supply system 10, 10A of the above-described embodiments. Further, the in-vehicle power supply system 70 is configured to step down the electric power of the power supply trunk line 76 from 48 volts to 12 volts by the DC/DC converter 74 and then supply the stepped-down electric power to a small electric power load 75, and to supply the electric power of 48 volts of the power supply trunk line 76 to a large electric power load 73 as it is.

By comparing the in-vehicle power supply system 60 of FIG. 3A and the in-vehicle power supply system 70 of FIG. 3B, when power consumption of the large electric power loads 63, 73 is the same, magnitudes of load currents i60, i70 flowing from the power supply trunk lines 66, 76 to the large electric power loads 63, 73 have a ratio of about 1:4.

Therefore, in the case of the in-vehicle power supply system 60, the power supply trunk line 66 needs to be formed of a thick electric wire. Further, since it is expected that a voltage fluctuation generated in the power supply trunk line 66 becomes large due to the large electric power load 63, it is necessary to increase a margin of a power supply voltage to be actually supplied with respect to a stable power supply voltage required by the small electric power load 65, and a loss of the electric power generated inside the small electric power load 65 side increases. That is, since the voltage of 12 volts supplied from the power supply trunk line 66 is not stable, for example, a converter that steps down 12 volts to generate a stable power supply voltage of 9 volts needs to be provided on the small electric power load 65 side, and an electric power loss occurs due to this converter. In addition, when another small electric power load 65 or the like is added, a voltage drop of the power supply trunk line 66 greatly increases due to a current consumed by the added load. Therefore, it is necessary to determine a specification of a system so as to limit a load to be added since a margin of a load that can be added is small.

In the case of the in-vehicle power supply system 70, since the load current i70 is small, a diameter of an electric wire of the power supply trunk line 76 can be reduced. In addition, since a voltage fluctuation generated in the power supply trunk line 76 is small, when a stable power supply voltage required by the small electric power load 75 is supplied from the DC/DC converter 74 as an output, a margin of the voltage can be reduced, and an electric power loss generated on a small electric power load 75 side can be reduced. In addition, when a new small electric power load 75 is to be added, there is little restriction on the small electric power load 75 to be added.

In addition, when a conversion efficiency in the DC/DC converter 64 of the in-vehicle power supply system 60 and a conversion efficiency in the DC/DC converter 74 of the in-vehicle power supply system 70 are the same, electric power losses that occur inside both are compared, and the DC/DC converter 74 has a smaller electric power loss than that of the DC/DC converter 64. That is, since an input current of the DC/DC converter 74 is smaller than that of the DC/DC converter 64, the electric power loss is reduced.

That is, as in the in-vehicle power supply system 10 of FIG. 1 and the in-vehicle power supply system 10A of FIG. 2, a power supply voltage of the power supply trunk lines 11, 11C, 11D and the like is increased to 48 volts, and the power supply voltage is stepped down by the DC/DC converters 16 inside the zone ECUs 15, 15A, 15B, 15C to generate the electric power of 12 volts, so that the diameters of the power supply lines of the power supply trunk lines 11, 11C, 11D and the like can be reduced as described above. Further, terminals, connectors, housings, and the like at positions where the power supply lines are connected can be miniaturized. As a result, a cost of all zone ECUs 15 and the entire wire harness can be reduced.

Although the DC/DC converter 16 in each zone may be connected to the outside of the zone ECU 15, a configuration of the wire harness can be simplified by incorporating the DC/DC converter 16 in the zone ECU 15.

While the presently disclosed subject matter has been described with reference to certain exemplary embodiments thereof, the scope of the presently disclosed subject matter is not limited to the exemplary embodiments described above, and it will be understood by those skilled in the art that various changes and modifications may be made therein without departing from the scope of the presently disclosed subject matter as defined by the appended claims.

According to an aspect of the embodiments described above, an in-vehicle power supply system (10, 10A) is configured to supply electric power to a large electric power load (14) configured to consume a first electric power and to a small electric power load (18) configured to consume a second electric power smaller than the first electric power. The in-vehicle power supply system includes a first power supply unit (for example, DC/DC converter 12) configured to output electric power having a first voltage (for example, 48 volts) higher than a total power supply voltage required by the large electric power load and the small electric power load, a plurality of zone management units (for example, zone ECUs 15, 15A, 15B, 15C) configured to respectively manage predetermined zones on the vehicle, a power supply trunk line unit (for example, power supply trunk lines 111, 1A to 11E) connecting the first power supply unit and the plurality of zone management units and a step-down conversion unit (for example, DC/DC converter 16) disposed in a zone of one zone management unit of the plurality of zone management units and configured to convert the electric power having the first voltage into electric power having a second voltage (for example, 12 volts) lower than the first voltage. The power supply trunk line unit includes a high-voltage power supply line (for example, power supply trunk lines 11C, 11D) configured to distribute the electric power having the first voltage.

According to the in-vehicle power supply system having the above-described configuration, since the power supply trunk line unit distributes the electric power having the first voltage which is a relatively high voltage, it is possible to reduce a current flowing through a wire harness at a portion connecting the first power supply unit and the plurality of zone management units. Therefore, it is also possible to reduce a diameter of the high-voltage power supply line. In addition, by using the step-down conversion unit, it is possible to generate a power supply voltage having the second voltage that is required by the small electric power load or the like. In addition, since the first voltage can be supplied to the large electric power load as it is, there is no need to boost the power supply voltage, and an increase in power loss is prevented. Since an input current of the step-down conversion unit is relatively small, an electric power loss caused by the step-down conversion unit stepping down the power supply voltage is smaller than that in a case of boosting the power supply voltage.

The step-down conversion unit (DC/DC converter 16) may be incorporated in one (zone ECUs 15, 15A, 15B, 15C) of the plurality of zone management units.

With this configuration, since it is not necessary to connect a power supply line necessary for using the step-down conversion unit to the outside of the zone management unit, a configuration of the wire harness can be simplified.

A part of the power supply trunk line unit may include a low-voltage power supply line (for example, power supply trunk line 11E) configured to distribute the electric power having the second voltage.

With this configuration, since the electric power having the second voltage can be directly acquired from the power supply trunk line unit at a location where the low-voltage power supply line is included, the electric power having the second voltage can also be used for the small electric power load in a zone where the step-down conversion unit does not exist. Therefore, it is not necessary to provide the step-down conversion unit in all of the plurality of zone management units, and a configuration of the entire system can be simplified.

Each of the plurality of zone management units may be configured to supply the electric power having the first voltage to the large electric power load in the managing zone and supply the electric power having the second voltage to the small electric power load in the managing zone.

With this configuration, since the electric power having the second voltage output by the step-down conversion unit is consumed only by the small electric power load of the corresponding zone, the step-down conversion unit can be miniaturized. In addition, it is possible to reduce a current flowing to the large electric power load in the corresponding zone.

The in-vehicle power supply system may further include, on an input side of the first power supply unit, a second step-down conversion unit (DC/DC converter 12) configured to step down a vehicle drive system high voltage (for example, several hundred volts) higher than the first voltage to the electric power having the first voltage.

With this configuration, in a case of a vehicle equipped with a high-voltage power supply of about several hundred volts for driving the vehicle, such as a hybrid car or an electric vehicle, electric power from the high-voltage power supply can be supplied to the first power supply unit via a second step-down conversion unit as an input.

What is claimed is:

1. An in-vehicle power supply system configured to supply electric power to a large electric power load configured to consume a first electric power and to a small electric power load configured to consume a second electric power smaller than the first electric power, the in-vehicle power supply system comprising:
   a first power supply unit configured to output electric power having a first voltage higher than a total power supply voltage required by the large electric power load and the small electric power load;
   a plurality of zone management units configured to respectively manage predetermined zones on the vehicle;
   a power supply trunk line unit connecting the first power supply unit and the plurality of zone management units; and
   a step-down conversion unit disposed in a zone of one zone management unit of the plurality of zone management units and configured to convert the electric power having the first voltage into electric power having a second voltage lower than the first voltage,
   wherein the power supply trunk line unit includes a high-voltage power supply line configured to distribute the electric power having the first voltage, and
   wherein the step-down conversion unit is incorporated in one of the plurality of zone management units.

2. The in-vehicle power supply system according to claim 1,
   wherein a part of the power supply trunk line unit includes a low-voltage power supply line configured to distribute the electric power having the second voltage.

3. The in-vehicle power supply system according to claim 1,
   wherein each of the plurality of zone management units is configured to supply the electric power having the first voltage to the large electric power load in the managing zone and supply the electric power having the second voltage to the small electric power load in the managing zone.

4. The in-vehicle power supply system according to claim 1, further including, on an input side of the first power supply unit, a second step-down conversion unit configured to step down a vehicle drive system high voltage higher than the first voltage to the electric power having the first voltage.

* * * * *